Oct. 30, 1945.  R. J. SHARP  2,388,091
SPRINGLESS COUNTER SCALE
Filed Nov. 13, 1944
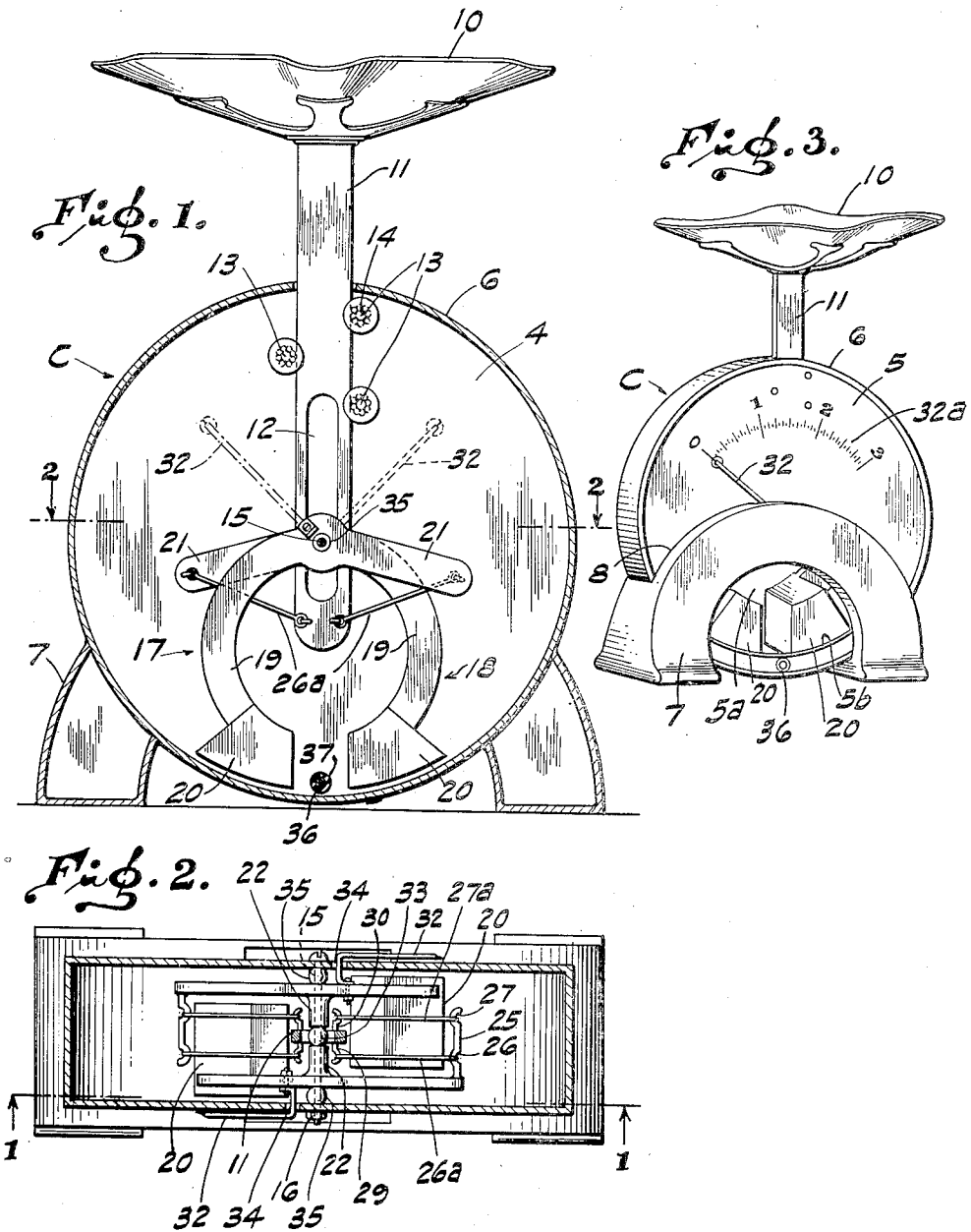
RENWICK J. SHARP,
INVENTOR.

Patented Oct. 30, 1945

2,388,091

UNITED STATES PATENT OFFICE 2,388,091

SPRINGLESS COUNTER SCALE

Renwick J. Sharp, Guatemala, Guatemala

Application November 13, 1944, Serial No. 563,129

5 Claims. (Cl. 265—61)

This invention relates to a springless counter scale. More specifically speaking, the invention relates to that type of springless scales wherein a scale pan is operatively connected with one or more swingable counter-weighted levers, such lever or levers in turn actuating a weight-indicating means.

One object of the invention is to simplify and stabilize the structure of a scale of the above stated type.

Another object is to provide a small, light scale that can be manufactured at a very low cost, and which can be profitably sold at a very low price, thereby commending it to proprietors of small stores and shops, particularly to those situated in rural districts, or to those located in countries where commercial enterprise is in a backward condition.

Still another object is to provide two scale pan operated oppositely swinging weighted levers which are so arranged that the friction resulting from the movable parts is minimized, and at the same time it is made convenient to provide the scale with double weight indication which is observable from opposite sides of the counter, by both the customer and the salesman.

Other objects, advantages and features of the invention will hereinafter appear.

Referring to the drawing which illustrates what is at present deemed to be a preferred embodiment of the invention, Fig. 1 is a section on line 1—1 of Fig. 2.

Fig. 2 is a horizontal section on line 2—2 of Fig. 1, except that certain interior parts are shown in plan.

Fig. 3 is a perspective view of the device on a smaller scale.

Referring in detail to the drawing, the dial plates 4 and 5 are provided, which are surrounded by a rim plate 6 thereby forming a circular casing C. This casing is shown supported by an arcuate base member 7 having through its upper portion an arcuate slot 8 within which is fitted the lower segment of said casing, being therein secured by a friction tight fit or by any well known conventional securing means. Said dial plates 4 and 5 may be twins, but in the drawing the plate 5 is shown having an opening 5a cut through the part thereof which is included within the arcuate base member 7, this opening providing for inspection of interior portions of the device.

The weighing pan 10 is supported by an upstanding flat rod 11 having a longitudinal slot 12 extending along the midwidth of its lower portion. Through the upper portion of the casing C extend pins 13 carrying flanged, anti-friction rollers 14 which guide the rod 11 in its vertical movements. At the center of the casing there also extends therethrough a shaft 15 shown as a screw bolt the head of which abuts against one side of the casing while the nut 16 is screwed onto its projecting end at the opposite side of the casing.

Said shaft 15 forms a bearing for the oppositely disposed, twin weighted levers 17 and 18. Each of these levers comprises an arcuate body portion 19 carrying at one end a weight 20 and having at its opposite end a tangential extension 21, the pivotal mounting of each lever being at the juncture of said parts 19 and 21. Each of said levers is also furnished with a bearing hub 22 which projects toward that of the other when the levers are swingably mounted upon the shaft or pivot pin 15 as shown in Fig. 2, with a globular spacer 33 mounted between them on their pivot pin 15.

Describing next the means for operatively connecting the levers 17 and 18 with the pan-carrying rod 11, the outer part of the extension 21 of each lever has rigidly secured to it a finger 25 which is furnished with an inner seat 26 and an outer seat 27 these seats facing away from the center of the device and preferably being made, as shown, by forming small bends in said fingers. From these seats looped cords of fine wires 26a and 27a lead to like seats formed in fingers 29 and 30, the latter fingers desirably being opposite end portions of pins which extend through opposite side portions of the lower part of the rod 11, below its slot 12. Said wire cords, and the seats for them are symmetrically arranged on opposite sides of the midwidth of the casing, as shown.

Each of the twin levers 17 and 18 has rigidly secured to it, in a radial relation to the axis about which it swings, an indicating pointer 32 which cooperates with a suitable graduated weight-indicating scale 32a on its side of the casing. These pointers are of an angular character and their basal portions pass through suitable openings 34 provided for them in the casing. The pointers and levers by which they are carried are kept from shifting into contact with the casing by means of globular spacers 35 carried by the end portions of the pivot pin 15 just inside the casing.

Mentioning additional structural details, the opening 5a has its lower edge spaced inwardly from the lower side of the casing C, thus providing a flange or rim member 5b along the lower side of said opening. A pin 36 extends transversely through this part of the casing and is held in place by any desired conventional means. This pin extends along the vertical plane which bisects the casing and carries a cushioning sleeve 37 which acts as a bumper against opposite sides of which the weights 20 may strike when an object that has been weighed is suddenly removed from the pan 10. Said weights are so positioned as to gravitate, when the scale pan is empty, to the positions shown in Figs. 1 and 3 wherein each of the pointers 32 are directed toward zero. By equally varying the size of the levers 17 and 18, and more particularly of their weighted end portions, the weighing capacity of the scale may be increased or decreased.

The operation of the device will be readily understood from the foregoing description. However, it should be noted that the scale pan carrying rod 11 is located at the midwidth of the casing, and the two pairs of wire cords 26a, 27a, whereby said rod applies downward traction to the lever portions 21, are so positioned as to distribute the stress in a balanced manner upon said rod as it moves downwardly during weighing operations, thus swinging farther apart the weighted ends of the arcuate levers 17 and 18. The balanced arrangement of the movable parts is due in part to the fact the lever 17 is so positioned that its body portion swings adjacent to one side of the casing simultaneously with the swinging of the body portion 18 adjacent to the opposite side of the casing.

It should be understood that the present disclosure is for the purpose of illustration only and that this invention includes all modifications and equivalents which fall within the scope of the subject matter claimed.

What is claimed is:

1. In a weighing scale, a casing having two upstanding spaced apart parallel side walls, a rod upstanding from the interior of said casing and projecting upwardly therefrom, a weighing pan carried by the upwardly projecting portion of said rod, said rod having a longitudinally extending slot through it within said casing, a pivot pin extending transversely of said casing and through said slot, two levers within said casing supported by said pin, one to swing adjacent to one side wall of the casing and the other to swing adjacent to the opposite side wall thereof, each of said levers having a bearing hub around said pin and extending to a point adjacent to the midwidth of the casing, a weight carried by the end portion of each of said levers at one side of its pivot, a finger carried by the opposite end portion of each lever, said finger projecting laterally across the midwidth of the casing, at least one traction cord connecting each of said fingers with the pan-carrying rod, whereby to swing the weighted ends of said levers upwardly a varying distance proportionate to the amount of weight deposited in the aforesaid pan, and a weight indicator carried by and swinging with at least one of said levers.

2. In a weighing scale, a casing having two upstanding spaced apart parallel side walls, a rod upstanding from the interior of said casing and projecting upwardly therefrom, a weighing pan carried by the upwardly projecting portion of said rod, said rod having a longitudinally extending slot through it within said casing, a pivot pin extending transversely of said casing and through said slot, two levers within said casing supported by said pin, one to swing adjacent to one side wall of the casing and the other to swing adjacent to the opposite side wall thereof, each of said levers having a bearing hub around said pin and extending to a point adjacent to the midwidth of the casing, a weight carried by the end portion of each of said levers at one side of its pivot, a finger carried by the opposite end portion of each lever, said finger projecting laterally across the midwidth of the casing, each of said fingers having two seats equidistant from opposite sides of the midwidth of the casing, a traction cord which at all times leads at a downward inclination to the lower portion of the pan-carrying rod and is anchored to the later, said cords extending parallel to the vertical median plane of the casing, and a weight indicator carried by and swinging with each of said levers.

3. The subject matter of claim 2, and said weight indicators comprising pointers having offset end portions attached to said levers adjacent to their axis of swing, there being apertures in the casing walls through which said offset portions of said pointers extend, and a graduated weight indicating scale inscribed upon each side face of the casing with which the free end portions of said pointers cooperate.

4. In a weighing scale, a casing having two upstanding spaced apart parallel side walls, a rod upstanding from the interior of said casing and projecting upwardly therefrom, a weighing pan carried by the upwardly projecting portion of said rod, a pivot pin extending transversely of said casing, two arcuate levers within said casing supported by said pin to swing in opposite directions, each of said levers having a weighted end portion extending in a more or less downward direction during all operative positions of the device, weight indicating means operatively connected with said levers, and operating connections between said pan-carrying rod and said levers to swing the latter, said operating connections consisting of two pairs of wire cords, whereby said rod applies downward traction to said levers, and said cords are so positioned as to distribute the stress in a balanced manner upon said rod as it moves downwardly during weighing operations, thus swinging farther apart the weighted ends of said arcuate levers.

5. The subject matter of claim 4, and a pin extending transversely of the lower portion of said casing, and a bumper common to both weighted end portions of said levers carried by said pin against opposite sides of which said weighted end portions of said levers may strike.

RENWICK J. SHARP.